March 15, 1927.
J. F. GAYLORD
1,620,724
VARIABLE SPEED GEARING
Filed Dec. 2, 1924
2 Sheets-Sheet 2
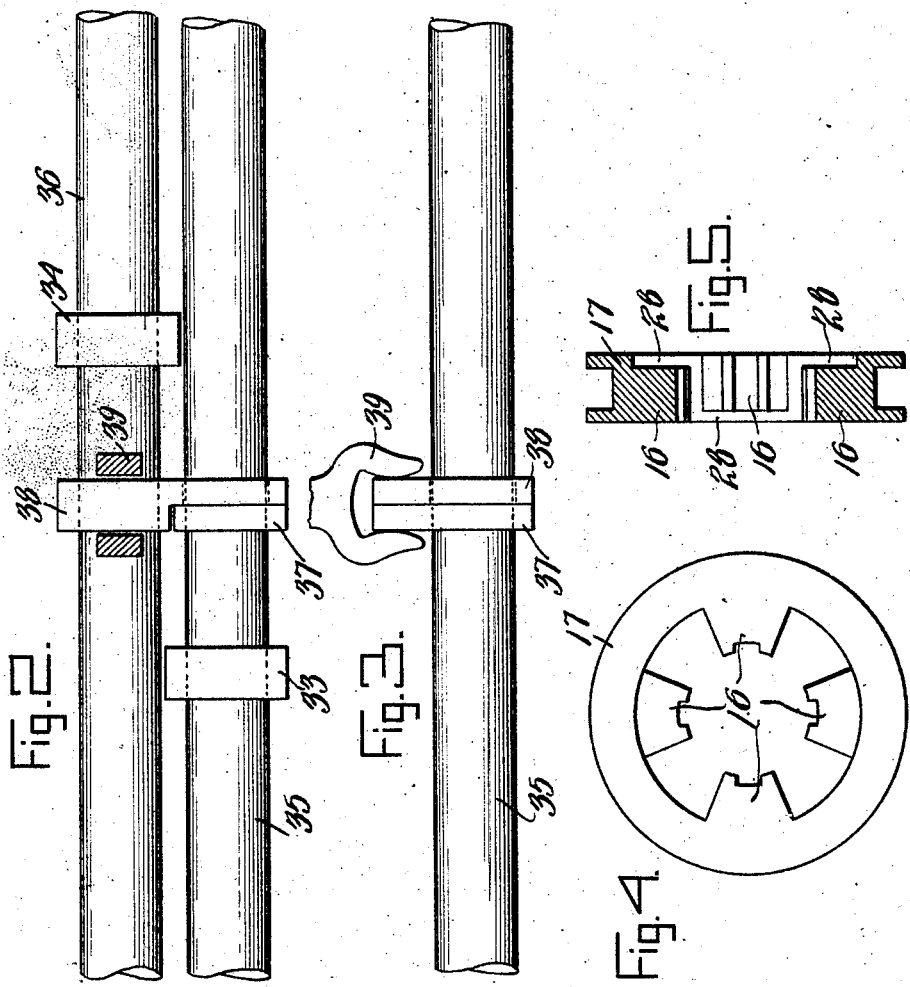
Inventor
John F. Gaylord Patented Mar. 15, 1927.

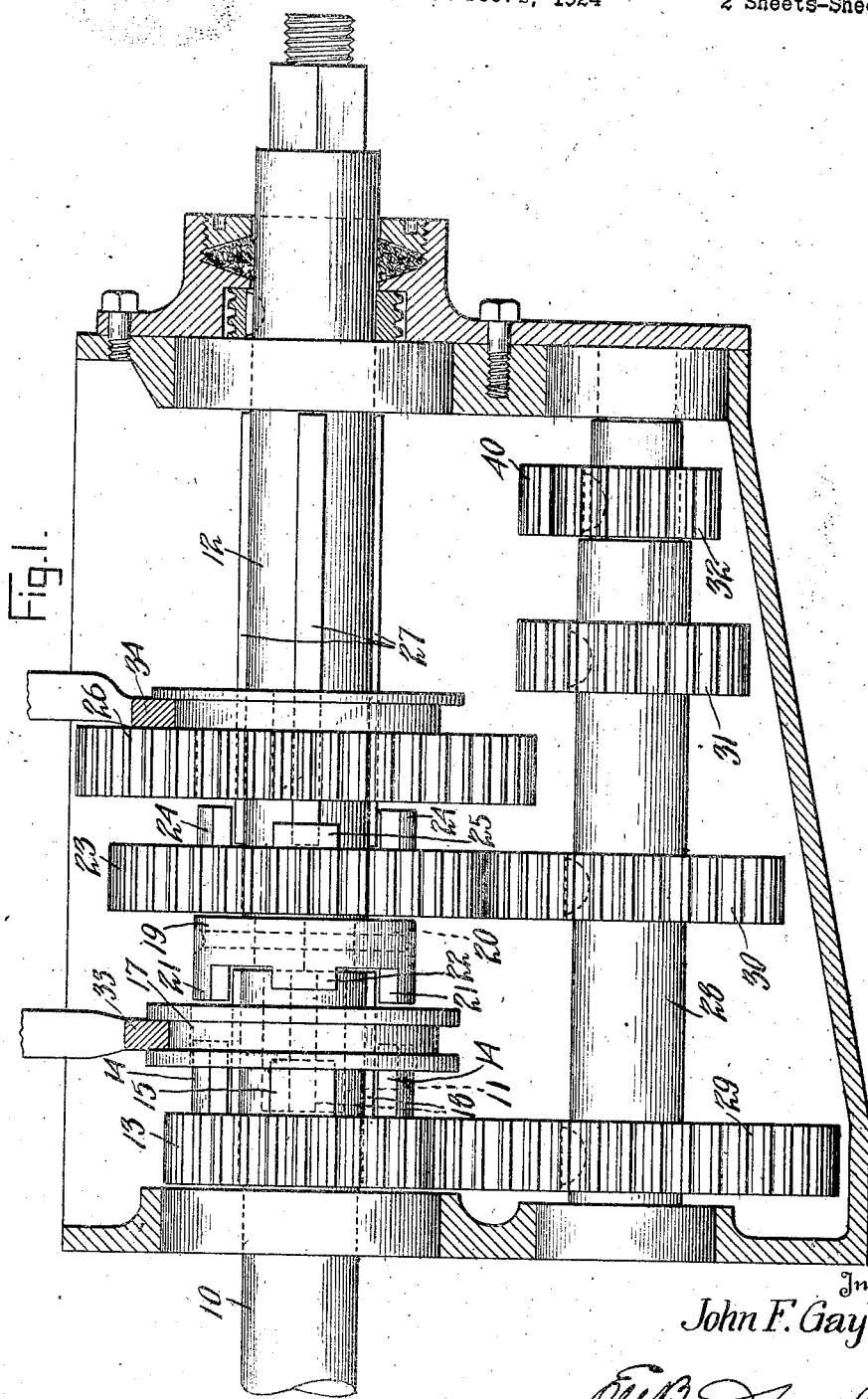

1,620,724

UNITED STATES PATENT OFFICE.

JOHN F. GAYLORD, OF INDIANAPOLIS, INDIANA.

VARIABLE-SPEED GEARING.

Application filed December 2, 1924. Serial No. 753,517.

My said invention relates to a variable speed transmission mechanism for automobiles and the like and it is an object of the same to provide a simple and durable device of this character which shall be inexpensive to manufacture.

A further object of the invention is to provide a change speed mechanism in which the gears may be shifted at any time without damage thereto regardless of the relative speeds of the driving and driven members.

Referring to the accompanying drawings which are made a part hereof and on which similar reference characters indicate similar parts, Figure 1 is a side elevation of my said device, Figure 2, a detail of clutch shifting means, Figure 3, a detail of clutch shifting means taken in a plane at right angles to Figure 2, Figure 4, a face view of a clutch member which forms a part thereof, and Figure 5, a longitudinal section of said clutch member.

In the drawings reference character 10 indicates the engine shaft of the device having a socket indicated in dotted lines at 11 to receive the reduced end of transmission shaft 12. A gear 13 is loose on shaft 10, said gear having long and short clutch dogs 14 and 15 extending to the right for engagement with inwardly extending clutch dogs 16 on a clutch member 17 splined to the driving shaft at 18 so as to rotate with the shaft while slidable lengthwise thereof. At the end of shaft 12, next to shaft 10, a clutch member 19 is secured by a key 20 to prevent movement in an axial direction, and said member 19 has a squared opening fitting on the square end of the shaft to insure rotation in unison. Long and short clutch dogs 21 and 22 are provided for engagement with dogs 16.

At the right of clutch member 19 a gear 23 is loosely mounted on shaft 12, and this gear has long and short clutch dogs 24 and 25 for engagement with inwardly extending dogs on a gear member 26 splined to shaft 12 at 27 for rotation therewith but slidable lengthwise thereof. The clutch member 17 has alternate dogs reduced in length as indicated at 28 and this reduction in height is found at each side of said member, i. e. one dog will be flush with the clutch face at the left side as in Figure 5 said dog being short at the right, while the next dog will be flush with the clutch face at the right side and short at the left. This is to insure clutching engagement with the long and short clutch dogs of members 17 and 26 regardless of difference in rates of rotation of the members to be engaged. It will be evident that should a long dog on one member strike a long dog on the other, the one will slip off the other, whereupon it may advance while passing the short dog, but will then engage positively with the next long dog after which it may be advanced to the position of full engagement. The clutch member 26 has a coacting member, (i. e. 23) at one side only, hence the internal teeth of said clutch member need be short and long only at the left side of said member.

A countershaft 28 has a series of fixed pinions 29, 30, 31 and 32 of which the first engage constantly with gears 13 and 23 respectively. It will be seen that when the member 17 is shifted to the right a firm and rigid engagement will take place between the shafts 10 and 12 so that the transmission will be at high speed, the member 19 being fixed to shaft 12 and member 17 splined to shaft 10. When the clutch member 17 is shifted to the left the other gear member 26 will also be shifted to engage its inwardly extending dogs with long and short dogs 24 and 25 on the gear 23 by means of a shifting mechanism including forks 33 and 34 engaging annular grooves in the respective slidable clutch members. These forks are carried respectively by slidable rods 35 and 36, one of which has a fixed collar 37 and the other a fixed collar 38 loosely embracing the first-named rod and overlapping the collar 37 as shown in Figure 2. A fork 39 of ordinary type is mounted for lateral movement to engage one collar as in Figure 2, or both as in Figure 3 after which it is movable to slide both rods at once in an endwise sense, or only one according to its engagement with the collars.

As above set forth the clutch members may both be moved to the left when the fork is as in Figure 3. In this situation the drive will be through the engine shaft 10, gear 13, pinion 29, a countershaft 28, a pinion 30 and gear 23, the ratio of the gears being such that the next highest speed will be imparted to the driven shaft.

It will be understood that the position of the gearing in Figure 1 is the neutral position from which it moves to the right for high speed and to the left for second speed. To secure low and reversed speeds the fork 39 is moved into the position of Figure 2 and then shifted to the right, whereby gear 26 can be moved first into engagement with gear 31 for low speed and then into engagement with idler 40 which drives pinion 32 for reverse movement. Whenever clutch member 17 is in the position of Figure 1 (or the second speed position further to the left) the countershaft is driven as are also its pinions and any gear meshing with them.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. A change speed transmission comprising a driving shaft, a driven shaft, a combined gear and clutch member on the driving shaft, a clutch member on the driven shaft, a clutch member splined on the driving shaft between said pair of members and adapted to be moved into engagement with the combined gear and clutch member for causing the same to rotate with its supporting shaft and adapted to be moved in the opposite direction for effecting a drive directly between the driving and the driven shafts, a jack shaft, a plurality of fixed gears on said jack shaft, one of said gears engaging the combined gear and clutch member on the driving shaft, a combined gear and clutch member rotatably mounted on the driven shaft, and a second combined gear and clutch member splined on the driven shaft and movable into engagement with the first mentioned combined gear and clutch member on the driven shaft to cause the same to rotate with the shaft, the gear and clutch member splined on the driven shaft being also movable into engagement with gears on the jack shaft for effecting low or reverse speeds, substantially as set forth.

2. A change speed transmission comprising a driving shaft having a combined gear and clutch member rotatably mounted thereon adjacent its end, a clutch member splined on said driving shaft between said member and the end of the shaft, a driven shaft having a clutch member fixed on its end adjacent the clutch member splined on the driving shaft, a combined gear and clutch member rotatably mounted on the driven shaft adjacent said fixed clutch member and a second combined gear and clutch member splined on said shaft adjacent the last mentioned gear and clutch member, a stub shaft, a gear on said stub shaft in engagement with the combined gear and clutch member on the driving shaft, a second gear on said stub shaft engaging the combined gear and clutch member on the driving shaft, a pair of additional gears on said stub shaft, and an idler gear engaging one of said additional gears whereby the first mentioned splined clutch member may be moved in one direction to cause the combined gear and clutch member on the driving shaft to revolve therewith or may be moved in the opposite direction to cause the driven shaft to revolve with the driving shaft directly, and the combined gear and clutch member splined to the driven shaft may be moved into engagement with its associated combined gear and clutch member to cause the same to revolve with the driven shaft and may be moved in the opposite direction to two positions to cause the driven shaft to be revolved at a slow speed or in a reverse direction, substantially as set forth.

In witness whereof, I have hereunto set my hand at Washington, District of Columbia, this twenty-sixth day of November, A. D. nineteen hundred and twenty-four.

JOHN F. GAYLORD.